United States Patent [19]

Furuichi et al.

[11] 4,435,747
[45] Mar. 6, 1984

[54] HIGH VOLTAGE SUPPLY SYSTEM FOR MEDICAL EQUIPMENT

[75] Inventors: Shuhei Furuichi, Shiga; Toshiaki Ikeda; Masakazu Suzuki, both of Kyoto, all of Japan

[73] Assignee: Kabushiki Kaisha Morita Seisakusho, Kyoto, Japan

[21] Appl. No.: 452,392

[22] Filed: Dec. 22, 1982

Related U.S. Application Data

[63] Continuation-in-part of Ser. No. 276,696, Jun. 23, 1981, abandoned.

[30] Foreign Application Priority Data

Jun. 27, 1980 [JP] Japan ............................ 55-88057

[51] Int. Cl.³ .................................... H02M 3/335
[52] U.S. Cl. ................................. 363/25; 363/91; 363/97; 323/250
[58] Field of Search ..................... 363/22–26, 363/59–60, 90–91, 95, 97, 133–134; 323/250, 254

[56] References Cited

U.S. PATENT DOCUMENTS

| | | | |
|---|---|---|---|
| 2,967,989 | 1/1961 | Eno et al. | 363/23 |
| 3,243,683 | 3/1966 | Ackley | 363/23 |
| 4,007,413 | 2/1977 | Fisher et al. | 363/18 |
| 4,135,233 | 1/1979 | Seiersen | 363/21 |
| 4,158,881 | 6/1979 | Simmons et al. | 363/25 |
| 4,213,084 | 7/1980 | Hiromitsu | 323/250 |

*Primary Examiner*—Peter S. Wong
*Attorney, Agent, or Firm*—Koda and Androlia

[57] ABSTRACT

This disclosure relates to a system for supplying a stable DC high voltage to a load by resonantly driving a high voltage transforming circuit comprising a VLT and a capacitor type multiple boosting circuit. The system includes a VLT, a capacitor type multiple boosting circuit and a pulse-amplitude feedback control circuit designed to detect supply voltage to load, to compare the detected voltage with reference voltage and to control the voltage of the control winding of VLT by using the deviation produced by the comparison as a control signal.

1 Claim, 8 Drawing Figures

HIGH VOLTAGE SUPPLY SYSTEM FOR MEDICAL EQUIPMENT

This is a continuation-in-part of Ser. No. 276,696, filed June 23, 1981, now abandoned.

BACKGROUND OF THE INVENTION

1. Field of the Invention

This invention relates to a DC high voltage supply system designed to supply a highly efficient and stable DC voltage to a load by providing a high voltage transformer circuit with a feedback control circuit, which transformer circuit is made up, in combination, of a variable magnetic leak transformer (VLT) driven under resonant conditions and a capacitor type multiple boosting circuit, and by controlling the current of the control winding of the VLT by the feedback control circuit.

2. Prior Art

In recent years a combination of a boosting transformer and a capacitor type multiple boosting circuit represented by a Cockcroft-Walton circuit has been in wide use so as to reduce the size and weight of a DC power source unit used for supplying DC high voltage power to an X-ray diagnostic apparatus, an electron microscope, sputtering apparatus and which constitutes a greater part of the volume and weight of both the boosting transformer and the multiple boosting circuit instead of the conventional method in which commercial frequency is boosted by a high voltage transformer and is then rectified.

But according to this combined use of the transformer and the circuit, it often happened that, viewed from the principle of the capacitor type multiple boosting circuit, the diodes used in the capacitor type multiple boosting circuit are damaged by the surge current generated during a sudden increase in load or during initial charging of the capacitor multiple boosting circuit.

Also, it is possible to think of using the capacitor type multiple boosting circuit by connecting large resistors in series with load for preventing the surge current generated in this case; but this way of tackling the problem causes a decrease in voltage regulation and an increase in power loss, with the result that efficiency of the system is greatly reduced.

Furthermore, slowing charging is also employed by providing a soft start circuit for preventing surge current when the power is on but it inevitably results in increased cost of the system because of the circuit being complicated.

SUMMARY OF THE INVENTION

Accordingly, a primary object of this invention is to provide a DC high voltage supply system of prolonged in service life and increased reliability by suppressing the surge current generated when the power is on or the load is suddenly increased.

Another object of this invention is to provide a DC high voltage supply system greatly improved in its driving efficiency and voltage regulation.

Still another object of this invention is to provide a DC high voltage supply system which is reduced in size and weight and provides high insulation.

It is yet another object of this invention to provide a DC high voltage supply system wherein the output voltage is constant.

These and other objects and characteristics of the present invention have been attained by the DC high voltage supply system for supplying a stable DC high voltage to load by resonantly driving a high voltage transformer circuit including a VLT (variable magnetic leak transformer) and a capacitor type multiple boosting circuit. The system includes a VLT, a capacitor type multiple boosting circuit, and a feedback control circuit. Furthermore, the VLT includes a primary winding driven by low voltage input power, a secondary winding for boosting the input voltage inputted by the primary winding and a control winding for controlling the output of the secondary winding. The capacitor type multiple boosting circuit includes a plurality of capacitors cascaded through diodes to each other with the input terminals of the capacitors connected to the secondary winding and the output terminal thereof connected to the anode and cathode terminals of load. The feedback control circuit is designed to detect a supply voltage from the anode terminal of the load to load L, to compare the detected voltage with the preset reference voltage, to control the control transistors by use of the deviation voltage produced by the comparison, and to control the current of control winding of the VLT.

The structure and preferred embodiments of the present invention will become more apparent from the detailed description thereof taken in conjunction with the accompanying drawings.

DETAILED DESCRIPTION OF THE INVENTION

Figure 1:
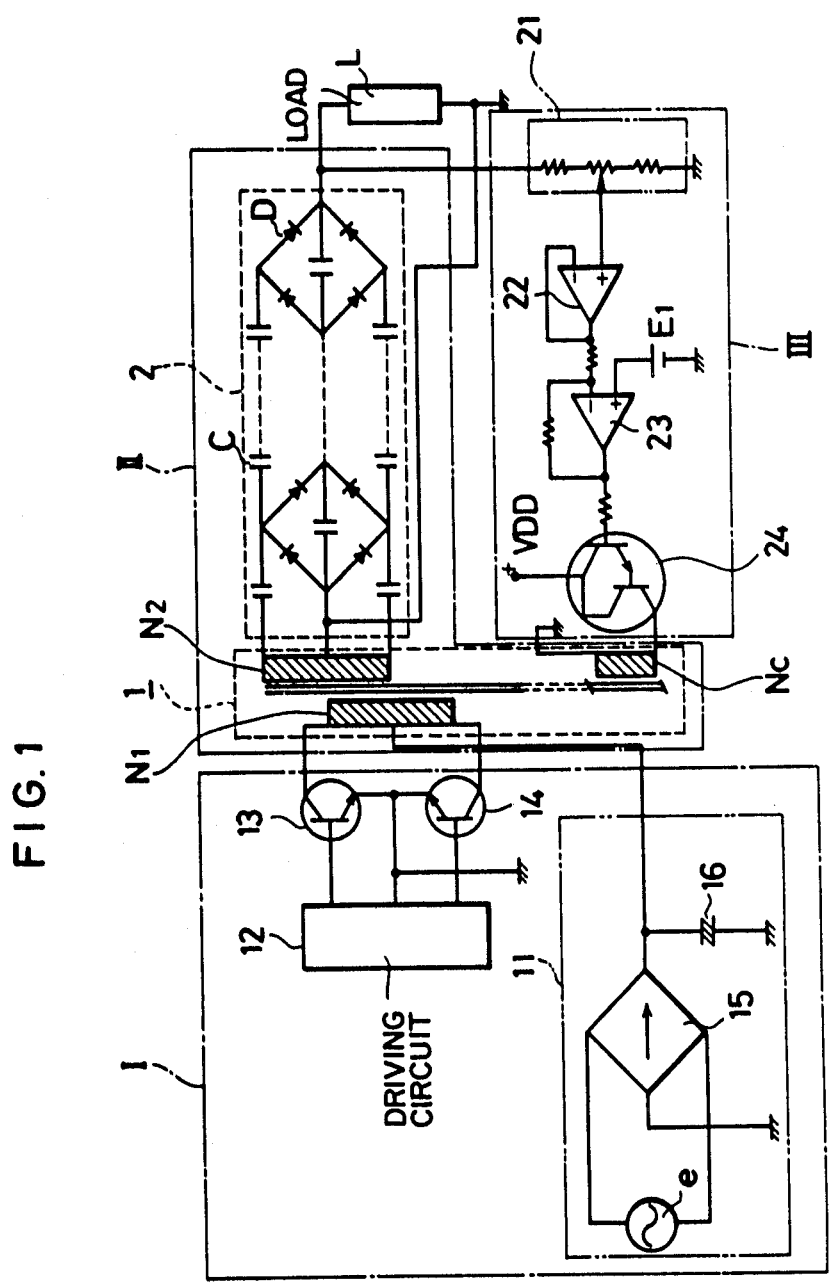
FIG. 1 shows a schematic circuit diagram of the invention.

Referring now to the drawings and particularly to FIG. 1, the numeral I designates a variable magnetic leak transformer (hereinafter referred to as "VLT") whose driving power circuit II is a high voltage circuit made up, in combination, of the VLT I and a capacitor type multiple boosting circuit including a plurality of capacitors C . . . cascaded to each other through a plurality of diodes D. The numeral III designates a feedback control circuit.

The driving power circuit II for VLT I is designed to drive the primary winding N1 of VLT by controlling NPN transistors 13 and 14 using a commercial AC power source C as a driving power source by connecting the AC power source to a midpoint tap of the VLT and by controlling the NPN transistors 13 and 14 connected to each other in push-pull by use of a driving circuit 12, the commercial power source C being rectified and smoothed by an all wave rectifier 15 and a smoothing condenser 16.

The high voltage transistor circuit II is of the construction in which a capacitor type multiple boosting circuit 2 is connected to the secondary side of VLT 1 and the anode terminal of load L is connected to the output terminal of the boosting circuit 2 and the cathode terminal of load L is connected to the mid-point tap of the secondary winding N2 of VLT.

The feedback control circuit III is designed to detect the voltage supplied to load L by detection resistor 21 connected to the anode terminal of load L, to compare the detected voltage with the reference voltage E1 adapted to set supply voltage to load by the comparator 23 through a buffer amplifier 22 and to convert the deviation obtained into a control signal, to control a control transistor 24, to supply control voltage to the control winding Nc of VLT to thereby to pulse-amplitude control the supply voltage set constantly at reference voltage E1 to load L.

To achieve pulse-amplitude control with the VLT, the control transistor 24 acts as a constant current source to the control winding Nc of the VLT so that the inclination of the magnetic flux characteristics of the control core varies with an increase in the control voltage to pulse-amplitude control the output voltage. As a further advantage of pulse-amplitude control, it allows a high-voltage DC power supply to be built which does not require a filtering reactor in the output. By eliminating the filtering reactor, the size, weight and cost of the supply can be reduced.

This invention includes, in combination, the circuits described above. The resonance output of the high voltage transformer circuit II, namely, a sinusoidal wave voltage having resonance frequency determined by the equivalent inductance of the secondary side of the variable magnetic leak transformer 1 and the equivalent capacitance on the input side of the multiple boosting circuit 2 is supplied to the load L in the form of a DC high voltage after the sinusoidal wave voltage has been subjected to full wave rectification.

Figure 2:
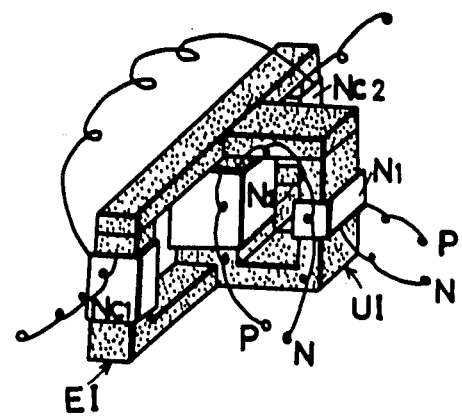
FIG. 2 shows a preferred embodiment of the invention.
Figure 3:
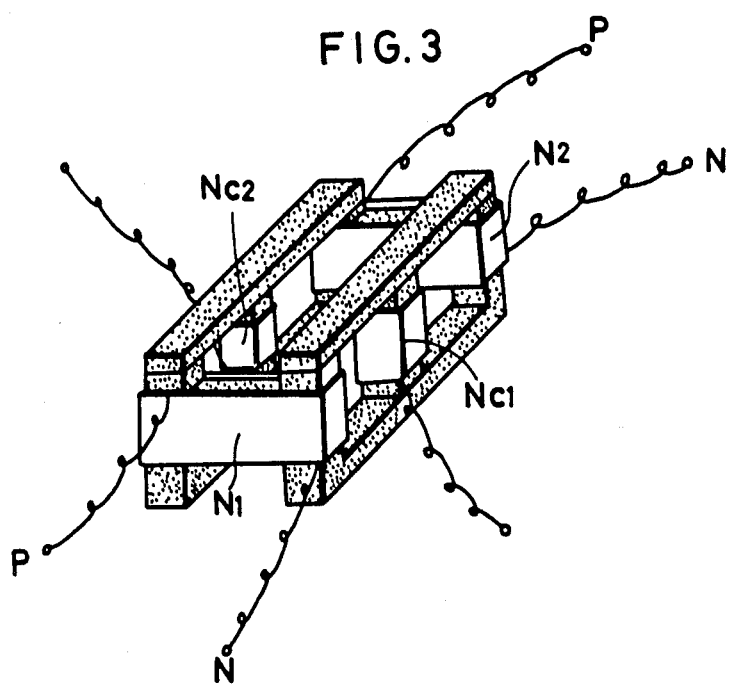
FIG. 3 shows another embodiment of the invention.

FIGS. 2 and 3 show embodiments of the VLT used in the invention. In the embodiment in FIG. 2 is used a T-type core, and the embodiment is constructed, in combination, of a U1 core and an E1 core constituting a bypass magnetic path connected to the U1 core. The reference characters N1 and N2 respectively designate a primary winding and a secondary winding of principal winding coiled around the U1 core, and Nc1 and Nc2 designate control winding coiled around both ends of core E1, the winding being connected in series in the direction in which electromotive force by a magnetic flux of the principal winding is erased.

FIG. 3 shows another embodiment of VLT. The embodiment shown is of a construction in which two ladder shaped cores are parallelly arranged and a primary side winding N1 and a secondary side winding N2 are arranged in an opposed relation with respect to both side ends of the core, and the control windings Nc1 and Nc2 are disposed in the middle of the windings N1 and N2, particularly with no mid-point tap provided on the primary and secondary winding sides.

The variable control magnetic leak transformer is provided in various forms other than the embodiments shown but, in short, the leak transformer serves the purpose so long as it has a primary magnetic path and a bypass magnetic path and can control the electromotive force reduced in the secondary side winding N2 by changing the magnetic resistance of the bypass magnetic path. Incidentally, the characters P and N shown in the embodiments designate respectively a positive and a negative electrode terminal of the principal winding.

Figure 4:
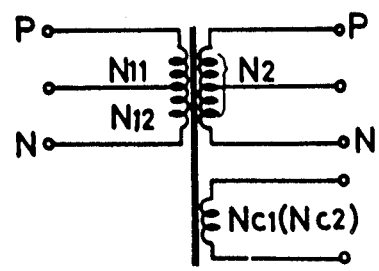
FIG. 4 shows a circuit diagram of the invention.

FIG. 4 shows an equivalent electric circuit of the VLT.

Figure 5:
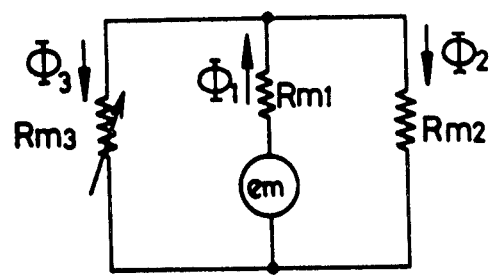
FIG. 5 illustrates the operating principle of the invention.

FIG. 5 is a diagram illustrating the control principle of the VLT. In the diagram, the character Em designates a magnetomotive force source for generating a magnetic flux $\phi 1$ and the primary magnetic flux $\phi 1$ determined by the source is divided into a control winding side flux $\phi 3$ and a secondary winding side flux $\phi 2$. The distribution ratio between the control winding side magnetic flux $\phi 3$ and the secondary winding side magnetic flux $\phi 2$ is determined by the distribution ratio between magnetic resistance Rm3 and Rm2; however, there exists a relation between the strength of magnetic field and magnetic resistance and the relation is represented by the equation $$Rm = l/\mu A \cdot \mu = B/H, \text{ hence } Rm \propto H$$

wherein Rm represents magnetic resistance; l length of magnetic path; R sectional area of magnetic path; H strength of magnetic field; and $\mu$ represents magnetic permeability. Accordingly, the magnetic resistance Rm3 of the control windings Nc1 and Nc2 is changed by applying control current to the control windings Nc1 and Nc2 and controlling the strength of magnetic field on the control magnetic winding side, with the result that the secondary generated electromotive force can be controlled by controlling the distribution of the secondary side magnetic flux $\phi 2$.

Figure 7:
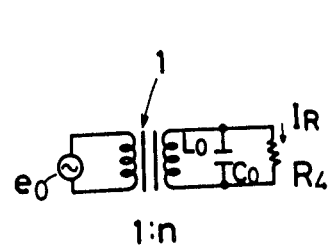
FIG. 7 is an electrically equivalent circuit diagram showing a resonance circuit.

FIG. 7 shows an electrically equivalent circuit in time of resonance of the high voltage transformer circuit II. The reference character eo designates an input power source of the VLT I; Lo an equivalent inductance on the secondary side of the VLT I; Co equivalent capacitance of capacitor type multiple boosting circuit 2; an RL designates a load L.

Since this invention employs a system by which DC high voltage is supplied to load L by resonantly driving the high voltage transformer circuit II, the current flowing to load L is represented by the equation $$iR = \frac{nEO}{R'(1 - W^2C'L') + jWL'}$$

wherein represents a transformation ratio of VLT.
In the state of resonance $1 - W^2C'L' = 0$
If W at this time is $$W_o iR = \frac{nE}{jW_oL'}$$

Figure 8:
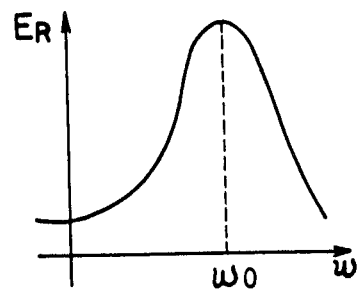
FIG. 8 is a voltage-frequency characteristic diagram with respect to voltage supplied to the load.

On the other hand, Q of a parallel resonance circuit is represented by $$Q = W_oCR' = \frac{R'}{W_oL'}$$

hence the voltage supplied to load L is represented by the equation $$IERl = \frac{R'}{W_oL'} \cdot n \cdot Eo = Q \cdot nEo$$

namely, voltage multiplied Q times as high as the transformation ratio n of VLT is supplied to load L. (See FIG. 8).

Accordingly, if Q of the resonance circuit is set at a suitable value larger than 1 (Lo and Co are suitably employed), the invention makes it possible to reduce the transformation ratio by 1/Q with respect to the same output in the case of non-resonance drive, with the result that the primary and secondary windings can be reduced in their number of windings. This fact contributes not only to the reduction of insulating countermeasures throughout the system but also to a further reduction in the size and weight of the system and in the price.

Figure 6:
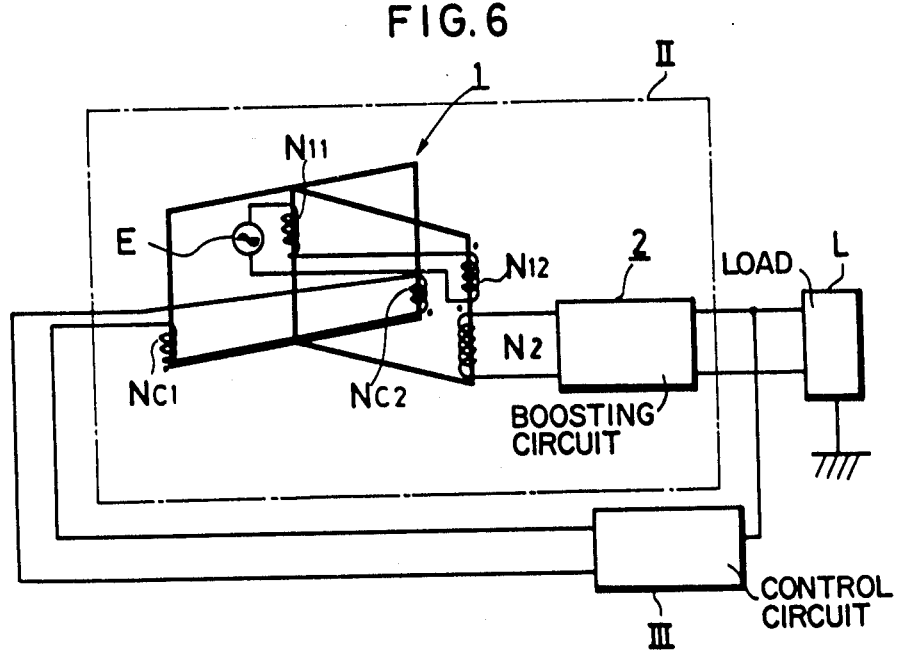
FIG. 6 typically shows the state of the invention after the invention was used.

FIG. 6 shows one embodiment of the general structure provided when the invention is driven by pulse.

As above, a description has been given of the structure and the operating principle of the invention, and the invention provides the following advantages:

1. Supply efficiency is good:

Since power is supplied to load L by resonantly driving the high voltage transformer circuit comprising a VLT and a capacitor type multiple boosting circuit, DC high voltage can be highly efficiently supplied to load L by suitably setting Q of the resonance circuit of the high voltage transformer circuit which is composed of VLT and capacitor type multiple boosting circuit;

2. Excellent durability and reliability:

Since supply of power to load is made by resonantly driving the high voltage transformer circuit comprising a VLT and a capacitor type multiple boosting circuit, load and the surge current and peak current flowing through the capacitor type multiple boosting circuit can be reduced even in the case wherein the VLT is driven by pulse. Accordingly, the possibility of breakdown of diodes due to flow of surge current is reduced and service life of the system is prolonged and reliability of the system is also improved;

3. Conducive to reduction in insulating countermeasures and in cost:

Since this invention is used by resonantly driving the high voltage transformer circuit, the ratio of difference in the number of windings between the primary and secondary windings with respect to the same output of the VLT; namely, number of windings, are reduced and insulating countermeasures are facilitated and the system itself is reduced in cost;

4. Having protection against short-circuiting:

Since the VLT is used, even if load current is increased due to short-circuiting, the magnetic flow on the control winding side is increased to thereby decrease the magnetic flux on the load side, resulting in protection against short-circuiting; and 5. Low in voltage fluctuations:

Since the supply of voltage to load is made by feedback control of the VLT, always constant and stable DC voltage is supplied to load. Accordingly, the system of this invention is ideal for a DC voltage power source for an X-ray diagnostic apparatus, sputtering device or the like which are exceedingly subject to damage by voltage fluctuations.

6. Reduced in size and weight:

Since pulse-amplitude control is utilized to eliminate a heavy and large filtering reactor and resonant driving is utilized to reduce the number of windings, the DC high voltage supply can be substantially reduced in size and weight when compared to pulse-width controlled and non-resonant driven DC high voltage supplies.

We claim:

1. A DC high voltage generation system for medical equipment comprising:
   a variable magnetic leakage transformer including primary, secondary and control windings;
   a capacitor type multiple boosting circuit comprising a plurality of capacitors cascaded through diodes to each other, said capacitor type multiple boosting circuit being coupled to said secondary of said variable magnetic leakage transformer and forming a resonant circuit with said variable magnetic leakage transformer;
   a driving circuit coupled to said primary winding of said variable magnetic leakage transformer for driving said system at a resonant frequency of the resonant circuit formed by said capacitor type multiple boosting circuit and said variable magnetic leakage transformer; and
   a pulse-amplitude feedback control circuit coupled to said control winding and a load of said DC high voltage generation system for pulse-amplitude controlling an output voltage of said DC high voltage generation system, said pulse-amplitude feedback control circuit comprising:
   a means for detecting a magnitude of said output voltage to said load;
   a means for presetting a reference voltage;
   a means for comparing said detected voltage with said reference voltage to produce a deviation voltage; and
   control transistors coupled to said control winding to act as a constant current source which in response to said deviation voltage pulse-amplitude control said output voltage.

* * * * *